May 18, 1943. S. STROBL 2,319,644
SHAPER TOOL HOLDER
Filed June 25, 1941 2 Sheets-Sheet 1
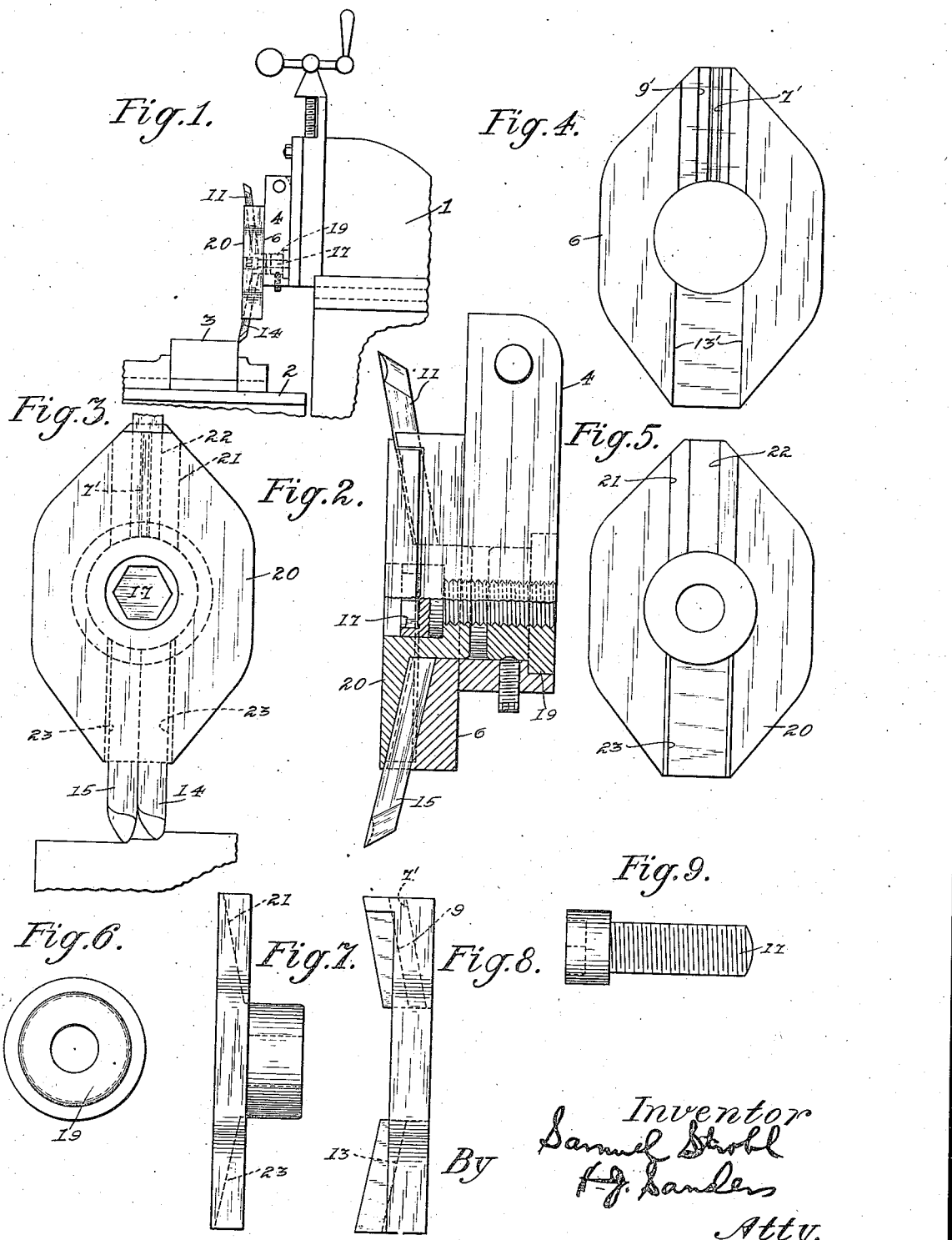

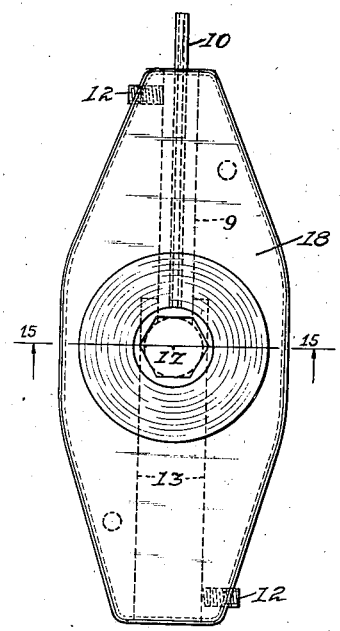
Fig.10.
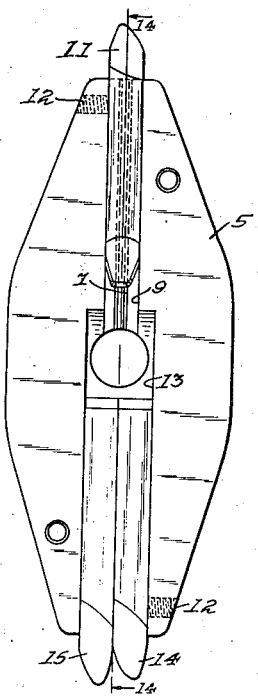
Fig.11.
Fig.12.
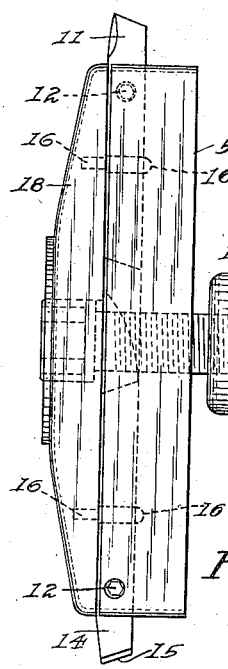
Fig.13.
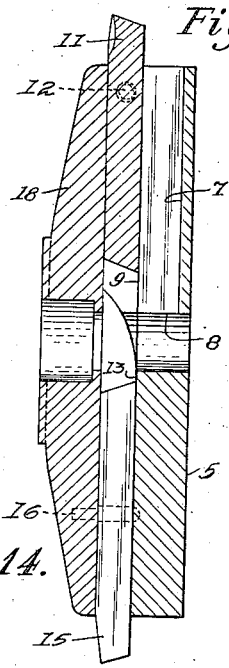
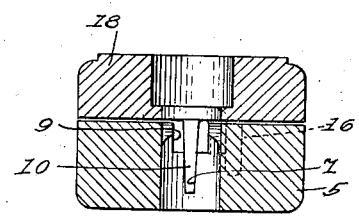
Fig.15.

Patented May 18, 1943

2,319,644

UNITED STATES PATENT OFFICE 2,319,644

SHAPER TOOL HOLDER

Samuel Strobl, Chicago, Ill.

Application June 25, 1941, Serial No. 399,656

2 Claims. (Cl. 29—48)

This invention relates to shaper tool holders. One object of the invention is to provide a shaper tool holder that eliminates the use of the conventional tool post, as well as that of the cutting-off tool holder.

A further object is to provide a shaper tool holder that carries and works with more than just one tool bit at the same time thus permitting cutting and finishing of the work at one and the same time. A further object of the invention is to provide a tool holder wherein a cutting-off blade is firmly held throughout the entire length of the holder.

A further object is to provide a shaper tool holder that does not employ set screws which frequently crack expensive tool bits. A still further object is to provide a tool holder adapted for recess or slot cutting at the base of a shoulder in the work as well as for cutting key-ways and the like in shafts or other stock and one wherein it is not necessary to move the carriage away from the work in order to use the micrometer, as is the case where the tool post and conventional holder are employed.

A still further object is to provide a shaper tool holder that is compact in assembly, one wherein the tool bit is so carried that its blade projects beyond the front face of the holder so that the latter does not contact or interfere with the stock under operation, and one that is very easily and readily assembled.

With the foregoing and other objects in view the invention consists in the combination and arrangement of parts to be hereinafter fully described, pointed out in the claims and illustrated in the accompanying drawings that form a part of this patent and in which—

Fig. 1 is a schematic view illustrating the application of the tool holder.

Fig. 2 is an enlarged view, partly in side elevation and partly in section, of the tool holder secured to the shaper head.

Fig. 3 is a face view of the tool holder showing two tools being used at the same time for cutting and finishing the stock.

Fig. 4 is a face view of the lower or under section of the tool holder.

Fig. 5 is a similar view of the upper or top section of the tool holder.

Fig. 6 is an end view of a nut employed.

Fig. 7 is a view in side elevation of the top section of the tool holder.

Fig. 8 is a similar view of the lower section of the same.

Fig. 9 is a view of the connecting screw employed.

Fig. 10 is a view in front elevation of a modified and preferred form of tool holder.

Fig. 11 is a similar view of the lower section of the tool holder with two tools shown in operative position and the third tool being carried ready for use when desired.

Fig. 12 is a rear face view of the cover section of the tool.

Fig. 13 is a view in side elevation of the preferred form of tool holder in assembly and ready for application to the shaper head.

Fig. 14 is a longitudinal central vertical sectional view through Fig. 11 on the line 14—14, and Fig. 15 is a cross sectional view through Fig. 10 on the line 15—15, looking in the direction of the arrows, with the screw removed.

Like reference characters denote corresponding parts throughout the several views.

The reference numeral 1 denotes a shaper and 2 the bed for the work 3. Removably and adjustably secured to the head 4 of the shaper is the instant tool holder which comprises a rear or base section 5 as shown in Figs. 13 and 14 illustrating the preferred form, or a rear section 6 as shown in Figs. 1, 2, 4 and 8 illustrating the secondary form. The base sections 5 and 6 are similar except that, referring now to the section 5 the same is formed with a deep recess 7 extending longitudinally from its central perforation 8 to the outer edge which recess is made shallow and widened on both sides to form the recess 9 co-extensive with said recess 7. The deep recess is adapted to receive the bit of a cutting-off blade 10 which bit is firmly held throughout the elongated recess 7.

The shallow recess 9 is adapted to receive the bit of a tool 11, when blade 10 is removed, which is correspondingly held in the recess and anchored by the headless screw 12. The recess 7 is of the same depth from end to end and the depth of the recess 9 likewise does not vary. Directly opposite the recesses 7, 9 is a wide recess 13 extending from the perforation 8 to the end of the section, said recess receiving the bits of the tools 14, 15, which in this instance are cutting and finishing tools placed edge to edge and adapted for use simultaneously. The recess 13 does not vary in depth from end to end. Secured to the base section 5 by locating pins 16 and by a connecting screw 17 is the top or cover section 18, said screw being received in the nut 19 located in the shaper head. The bottom face of the cover section is smooth, as shown in Fig. 12, and rests directly upon the top face of the base and upon the bits of the tools carried. The holder can be secured to the head 4 so that the tools carried are disposed vertically, the tools then at the lower end of the holder being in a working position; or the holder may be loosened somewhat from the head to permit movement through an arc of 180 degrees to dispose the topmost tools in working position; or the holder may be disposed at an oblique position to permit use for dovetailing work. When both tools 14, 15 are used at the same time the tool 15 projects slightly below the tool 14 and operates in the wake of the same as a finisher or follower tool.

Referring now to Figs. 1, 2, 3, 4, 5, 7 and 8 the base section 6, secondary form, has a deep recess 7', a wide shallow recess 9' and opposite thereto a wide recess 13' all of which recesses are tapered, being deepest nearest the center of the section and shallowest at the outer end so that the tool or tools disposed therein are inclined forwardly and outwardly beyond the plane of the front face of the cover section 20. The cover section 20 is formed with tapered recesses 21, 22, 23 complementary to the recesses 7', 9', 13' respectively of the base section to provide clearance for the bits of the tools held. By reference to Figs. 1 and 2 the position of the cutting edges of the tools held with respect to the topmost face of the cover section of the holder is quite apparent.

The application of these tools, so held, to the work is shown clearly in Fig. 1. Tools so held may be used for cutting a slot or recess at the base of a shoulder in the work, or for cutting key-ways in shafts or the like.

What is claimed is:

1. In a tool holder for shapers, a base section formed with a central perforation and with axially extending recesses located upon opposite sides of said central perforation, the recesses upon one side thereof comprising a deep narrow recess and a shallow wider recess, a very wide shallow recess being formed upon the opposite side of said central perforation, all of said recesses adapted to receive tools, headless screws upon opposite sides of said recesses with their passageways opening into said recesses, pin-receiving recesses arranged upon opposite sides of said recesses in spaced relation thereto; a cover section of similar shape to said base section formed with a central perforation, the bottom face of said cover section being smooth, locating pins carried by said cover section received in said pin-receiving recesses, a screw connecting said base and cover sections and passing through the central perforations thereof and securing said sections together and to the shaper, and a nut for said screw, said base and cover sections in one position upon said screw being movable through an arc of 180 degrees.

2. In a tool holder for shapers, a base section formed with a central perforation and with longitudinally extending recesses located upon opposite sides of said central perforation, the recesses upon one side of said central perforation being varied as to depth and width, all of said recesses adapted to receive tools, a cover section for said base section, means for securing said sections together in operative relation, a screw connecting said sections together and to the shaper and passing through said central perforation, said sections being movable about said screw through an arc of 180 degrees when free thereon, and a nut upon said screw.

SAMUEL STROBL.